(12) United States Patent
Kuzuyama

(10) Patent No.: US 9,032,930 B2
(45) Date of Patent: May 19, 2015

(54) COMBUSTION CONTROL DEVICE

(75) Inventor: Hiroshi Kuzuyama, Kariya (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 667 days.

(21) Appl. No.: 13/444,414

(22) Filed: Apr. 11, 2012

(65) Prior Publication Data

US 2012/0260887 A1 Oct. 18, 2012

(30) Foreign Application Priority Data

Apr. 12, 2011 (JP) .................. 2011-088244

(51) Int. Cl.
| | |
|---|---|
| *F02B 17/00* | (2006.01) |
| *F02D 41/40* | (2006.01) |
| *F02D 41/30* | (2006.01) |
| *F02B 23/06* | (2006.01) |
| *F02D 41/04* | (2006.01) |
| *F02B 1/12* | (2006.01) |
| *F02M 25/07* | (2006.01) |

(52) U.S. Cl.
CPC ............ *F02D 41/401* (2013.01); *F02D 41/047* (2013.01); *F02D 41/3035* (2013.01); *F02D 41/402* (2013.01); *Y02T 10/128* (2013.01); *Y02T 10/44* (2013.01); *F02B 23/0651* (2013.01); *F02B 23/0672* (2013.01); *F02B 1/12* (2013.01); *F02M 25/0707* (2013.01); *F02M 25/0728* (2013.01); *Y02T 10/125* (2013.01)

(58) Field of Classification Search
CPC ............. F02B 23/0651; F02B 23/0672; F02D 41/047; F02D 41/401; F02D 41/402; F02D 41/3035

See application file for complete search history.

(56) References Cited

U.S. PATENT DOCUMENTS

| | | | | | |
|---|---|---|---|---|---|
| 6,161,518 | A | * | 12/2000 | Nakakita et al. ............... | 123/298 |
| 6,840,209 | B2 | * | 1/2005 | Shimazaki .................... | 123/276 |
| 7,096,848 | B2 | * | 8/2006 | Ono et al. .................... | 123/294 |
| 7,827,957 | B2 | * | 11/2010 | Ishikawa ....................... | 123/299 |
| 8,156,927 | B2 | * | 4/2012 | Iikubo et al. ................. | 123/661 |

(Continued)

FOREIGN PATENT DOCUMENTS

| | | |
|---|---|---|
| EP | 1291516 A2 | 3/2003 |
| EP | 1803918 A1 | 7/2007 |

(Continued)

OTHER PUBLICATIONS

Communication dated Sep. 24, 2014, issued by the European Patent Office in counterpart European application No. 12163738.3.

*Primary Examiner* — Thomas Moulis
*Assistant Examiner* — Elizabeth Hadley
(74) *Attorney, Agent, or Firm* — Sughrue Mion, PLLC

(57) ABSTRACT

For providing a combustion control device capable of decreasing unburned HC caused by a fuel attaching to a bore wall of a cylinder and unburned HC/CO produced by excessive diffusion of the fuel in premixed charge compression ignition combustion, an injector control unit controls an injector so as to start an initial fuel injection when a crank angle corresponds to an initial fuel injection start time when a piston arrives at such a position that the fuel injected from the injector reaches a lip but falls short of reaching a bore wall face of a cylinder, and terminate a final injection when the crank angle corresponds to a final fuel injection end time, when the piston arrives at such a position that the fuel injected from the injector reaches the lip but falls short of reaching a region below the lip in a cavity.

4 Claims, 9 Drawing Sheets

(56) References Cited

U.S. PATENT DOCUMENTS

| | | | |
|---|---|---|---|
| 2002/0078918 A1* | 6/2002 | Ancimer et al. | 123/295 |
| 2005/0224606 A1* | 10/2005 | Dingle | 239/533.2 |
| 2007/0023005 A1* | 2/2007 | Chmela | 123/305 |
| 2009/0070002 A1* | 3/2009 | Ishikawa | 701/103 |
| 2013/0019838 A1* | 1/2013 | Lee et al. | 123/298 |
| 2014/0305402 A1* | 10/2014 | Zoeller et al. | 123/294 |

FOREIGN PATENT DOCUMENTS

| | | |
|---|---|---|
| EP | 2282041 A2 | 2/2011 |
| JP | 10-148128 A | 6/1998 |
| JP | 2003-083119 A | 3/2003 |
| JP | 2006-105046 A | 4/2006 |
| JP | 2007-120353 A | 5/2007 |
| JP | 2011-038417 A | 2/2011 |

* cited by examiner

COMBUSTION CONTROL DEVICE

BACKGROUND OF THE INVENTION

1. Field of the Invention

The present invention relates to a combustion control device for an engine which performs premixed charge compression ignition (PCCI) combustion.

2. Related Background Art

Known as an example of combustion control device for engines which perform premixed charge compression ignition combustion is one disclosed in Japanese Patent Application Laid-Open No. 2003-83119 (Patent Literature 1). The combustion control device disclosed in Patent Literature 1 has a conventional injection mode and a premixed compression injection mode as fuel injection modes. The conventional injection mode, which is used when an engine is under high load, injects a fuel from a fuel injection nozzle at a timing near a compression top dead center. The premixed compression injection mode, which is used when the engine is under low or medium load, injects the fuel from the fuel injection nozzle at a timing ranging from 50° to 20° before the compression top dead center. The injection angle at this time is set to such a given angle that the fuel reaches the inner wall of a cavity on the radially outer side from the lowermost position of the cavity in the conventional injection mode and at least the inner wall of the cavity in the premixed compression injection mode.

In the premixed charge compression ignition combustion of the prior art mentioned above, the fuel is injected to the inner wall of the cavity, whereby unburned HC is inhibited from being generated by the fuel attaching to the bore wall of the cylinder. However, there have been no proposals for measures against the production of unburned HC by premixed charge compression ignition combustion when the engine is under low load in particular. More specifically in this regard, during the low load operation of the engine, the fuel is injected by such a small amount as to become so thin when spread throughout the cavity that a part thereof fails to burn. Here, the phenomenon that the fuel diffuses thinly to such a level that it partly fails to burn will be referred to as excessive diffusion of the fuel. Parts hindered by the excessive diffusion from burning normally, if any, will generate unburned HC/CO. As a measure against it, first the fuel may be injected in the conventional injection mode when the engine is under low load as with high load. When injected near the compression top dead center in the conventional injection mode, the fuel is ignited sequentially, whereby the excessive diffusion is avoided. However, it cannot yield effects achieved by premixed charge compression ignition combustion such as less NOx.

SUMMARY OF THE INVENTION

It is one of objects of the present invention to provide a combustion control device which can decrease unburned HC caused by the fuel attaching to the bore wall of the cylinder and unburned HC/CO produced by the excessive diffusion of the fuel in premixed charge compression ignition combustion.

One aspect of the present invention provides a combustion engine control device for an engine having a piston disposed so as to be able to move up and down in a reciprocating manner within a cylinder and performing premixed charge compression ignition combustion, the device comprising a fuel injection valve for injecting a fuel into a combustion chamber formed by the cylinder and piston and injection valve control means for controlling the fuel injection valve so as to inject the fuel a plurality of times in portions; wherein an upper part of the piston is provided with a recessed cavity forming a part of the combustion chamber; wherein an upper end part of an inner wall face of the piston forming the cavity is provided with a lip projecting inwardly of the piston; wherein the injection valve control means has first control means for controlling the fuel injection valve so as to start an initial fuel injection when the piston arrives at a first elevation point before a compression top dead center and second control means for controlling the fuel injection valve so as to terminate a final fuel injection by the time when the piston arrives at a second elevation point located closer to the compression dead center than is the first elevation point; wherein the first elevation point is such a position that the fuel injected from the fuel injection valve reaches the lip but falls short of reaching a bore wall of the cylinder; and wherein the second elevation point is such a position that the fuel injected from the fuel injection valve reaches the lip but falls short of reaching a region under the lip in the cavity.

This combustion control device controls the fuel injection valve so as to start the initial fuel injection when the piston arrives at such an elevation point (the first elevation point before the compression top dead center) that the fuel injected from the fuel injection valve reaches the lip but falls short of reaching the bore wall of the cylinder, thereby preventing the fuel from attaching to the bore wall of the cylinder, thus decreasing unburned HC caused by the fuel attaching to the bore wall. It also controls the fuel injection valve so as to terminate the final fuel injection by the time when the piston arrives at such a position (the second elevation point located closer to the compression dead center than is the first elevation point) that the fuel injected from the fuel injection valve reaches the lip but falls short of reaching a region under the lip in the cavity, thereby preventing the fuel from being routed into the cavity, which forms a mixture (an air/fuel mixture) with high homogeneity in the upper part of the cavity. This decreases unburned HC/CO produced by the excessive diffusion of the fuel. Thus, not only unburned HC caused by the fuel attaching to the bore wall of the cylinder, but also unburned HC/CO produced by the excessive diffusion of the fuel can be decreased in premixed charge compression ignition combustion.

The combustion control device may further comprise load detection means for detecting a load of the engine, the first and second control means being executed when the load of the engine detected by the load detection means is lower than a predetermined value. When the load of the engine is low, the amount of injection of the fuel is so small that unburned HC/CO is more likely to be generated by the excessive diffusion of the fuel. Hence, controlling the fuel injection valve so as to perform the above-mentioned initial and final fuel injections when the engine load is lower than a predetermined value can efficiently decrease unburned HC/CO produced by the excessive diffusion of the fuel.

The second control means may control the fuel injection valve so as to terminate the final fuel injection when the piston arrives at the second elevation point. This can reliably decrease unburned HC/CO produced by the excessive diffusion of the fuel.

The lip may have a substantially flat leading end form. This makes it easier for the lip to receive the energy of a fuel spray when the fuel is injected from the fuel injection valve to the lip. As a consequence, the fuel spray floats about the lip, whereby a mixture with high homogeneity can effectively be formed in the upper part of the cavity.

According to one aspect of the present invention, unburned HC caused by the fuel attaching to the bore wall of the cylinder and unburned HC/CO produced by the excessive diffusion of the fuel in premixed charge compression ignition combustion can be decreased. This can achieve excellent premixed charge compression ignition combustion.

DESCRIPTION OF THE PREFERRED EMBODIMENTS

In the following, the combustion control device in accordance with an embodiment of the present invention will be explained in detail with reference to the drawings.

Figure 1:
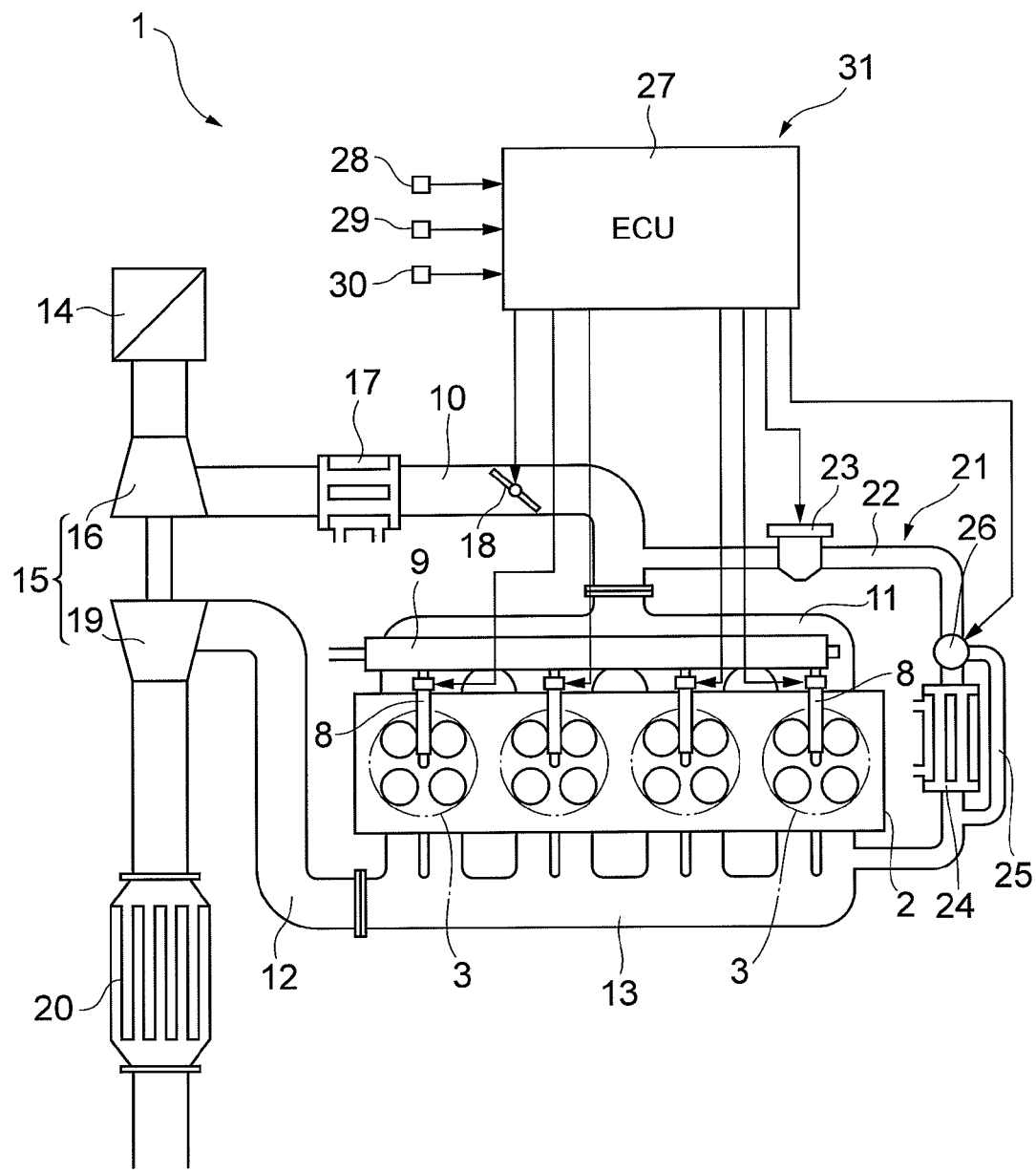
FIG. 1 is a schematic structural diagram illustrating a diesel engine equipped with the combustion control device in accordance with an embodiment of the present invention.

FIG. 1 is a schematic structural diagram illustrating a diesel engine equipped with the combustion control device in accordance with an embodiment of the present invention. In the drawing, the diesel engine 1 in accordance with this embodiment is an in-line four diesel engine of premixed charge compression ignition (PCCI) type. The diesel engine 1 is equipped with an engine body 2, which is provided with four cylinders 3.

Figure 2:
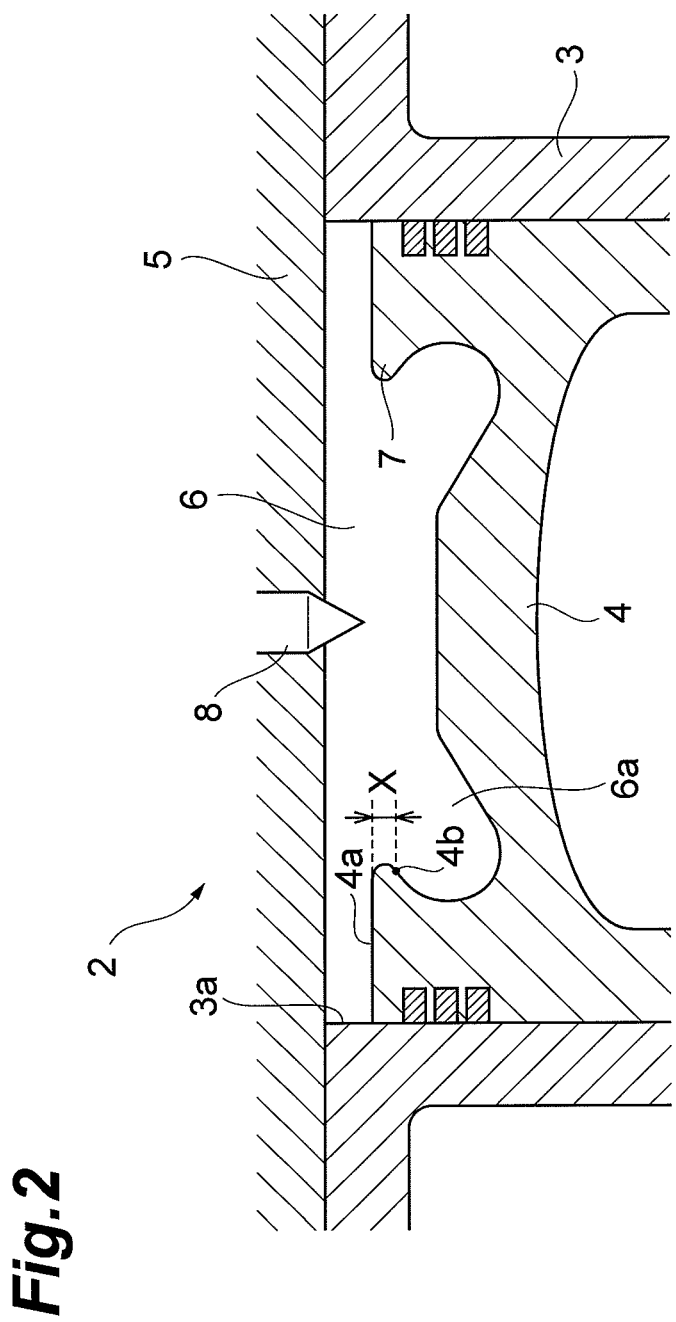
FIG. 2 is a sectional view of an engine body illustrated in FIG. 1.

As illustrated in FIG. 2, pistons 4 are accommodated in the cylinders 3 so as to be able to move up and down in a reciprocating manner. A cylinder head 5 is disposed on the upper side of the cylinders 3. A space surrounded by each cylinder 3, its corresponding piston 4, and the cylinder head 5 forms a combustion chamber 6. The upper part (top part) of the piston 4 is formed with a recessed cavity 6a constituting a part of the combustion chamber 6.

An upper end part of the inner wall face of the piston 4 forming the cavity 6a is provided with a lip 7 projecting inwardly of the piston 4. Here, the lip 7 indicates a range X from the upper face (top face) 4a of the piston 4 to a boundary point 4b at which the center of curvature of the inner wall face of the piston 4 is reversed through the inner wall face (the center of curvature of the inner wall face on the upper side is located within the wall of the piston 4, whereas the center of curvature of the inner wall face on the lower side is located in the cavity 6a).

Each cylinder 3 is provided with an injector (fuel injection valve) 8 for injecting a liquid fuel into the combustion chamber 6. The injector 8 has a plurality of nozzle holes (not depicted) and injects the fuel from the nozzle holes at appropriate injection angles (cone angles). Each of the injectors 8 is connected to a common rail 9, while a high-pressure fuel retained in the common rail 9 is always fed to each of the injectors 8.

An intake passage 10 for taking air into the combustion chambers 6 is connected to the engine body 2 through an intake manifold 11. On the other hand, an exhaust passage 12 for discharging an exhaust gas after burning is connected to the engine body 2 through an exhaust manifold 13.

The intake passage 10 is provided with an air cleaner 14, a compressor 16 for a turbo-supercharger 15, an intercooler 17, and a throttle valve 18 from the upstream side to the downstream side. The throttle valve 18 narrows the passage area of the intake passage 10, so as to generate a negative pressure on the downstream side, thereby enabling exhaust gas recirculation (EGR) which will be explained later. The exhaust passage 12 is provided with a turbine 19 of the turbo-supercharger 15 and a DPF 20 having a catalyst attached thereto.

The diesel engine 1 also comprises an exhaust gas recirculation (EGR) device 21 for recycling a part of the exhaust gas after burning into the combustion chambers 6. The EGR device 21 has an EGR passage 22 for connecting the intake passage 10 and the exhaust manifold 13 to each other, an EGR valve 23 for adjusting the amount of exhaust gas recirculation (EGR) gas recycled from the exhaust manifold 13 to the intake passage 10, an EGR cooler 24 for cooling the EGR gas passing through the EGR passage 22, a bypass passage 25 connected to the EGR passage 22 so as to bypass the EGR cooler 24, and a switching valve 26 for switching the flow path of the EGR gas between the EGR cooler 24 and the bypass passage 25.

Figure 3:
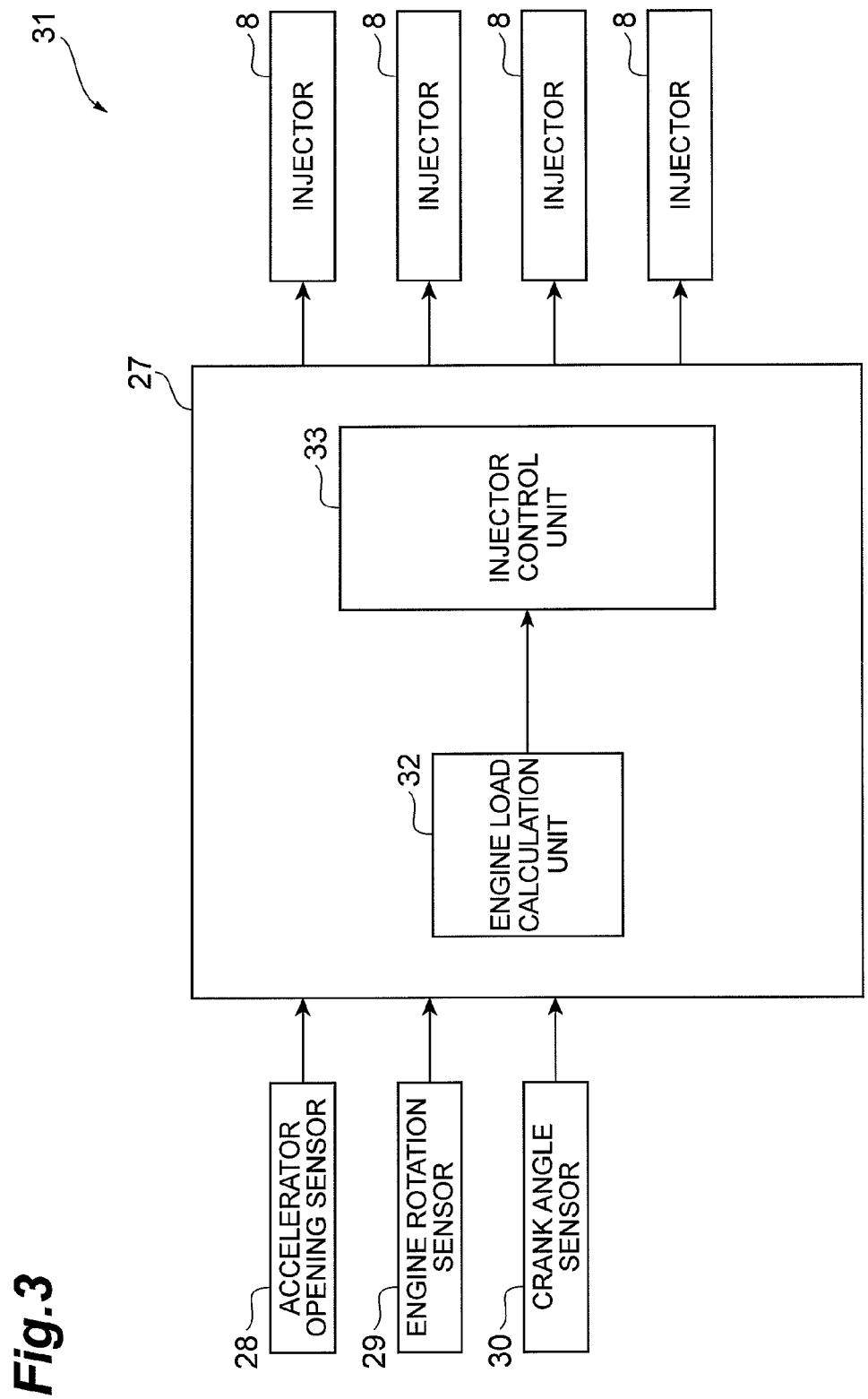
FIG. 3 is a block diagram illustrating the structure of the combustion control device depicted in FIG. 1.

The injectors 8, throttle valve 18, EGR valve 23, and switching valve 26 are controlled by an electronic control unit (ECU) 27. As also illustrated in FIG. 3, an accelerator opening sensor 28 for detecting the accelerator opening, an engine rotation sensor 29 for detecting the engine rotation speed, and a crank angle sensor 30 for detecting angles (crank angles) of the crankshaft of the pistons 4 are connected to the ECU 27. The crank angle sensor 30 detects the elevation point of each piston 4 with respect to its corresponding cylinder 3 as a crank angle.

Here, the injectors 8, ECU 27, and sensors 28 to 30 constitute a combustion control device 31 of this embodiment. Thus constructed combustion control device 31 controls each injector 8 so as to perform premixed charge compression ignition combustion in a divided injection which injects the fuel in two parts in one cycle comprising an intake stroke, a compression stroke, an expansion stroke, and an exhaust stroke.

FIG. 3 is a block diagram illustrating the structure of the combustion control device 31. In this drawing, the ECU 27 has an engine load calculation unit 32 and an injector control unit 33.

The engine load calculation unit 32 calculates the engine load according to the accelerator opening detected by the accelerator opening sensor 28, the engine rotation speed detected by the engine rotation sensor 29, and other conditions.

The injector control unit 33 controls the injectors 8 so as to make them inject the fuel to their corresponding combustion chambers 6 according to the accelerator opening detected by the accelerator opening sensor 28, the engine rotation speed detected by the engine rotation sensor 29, the engine load calculated by the engine load calculation unit 32, and the crank angles detected by the crank angle sensor 30.

Figure 4:
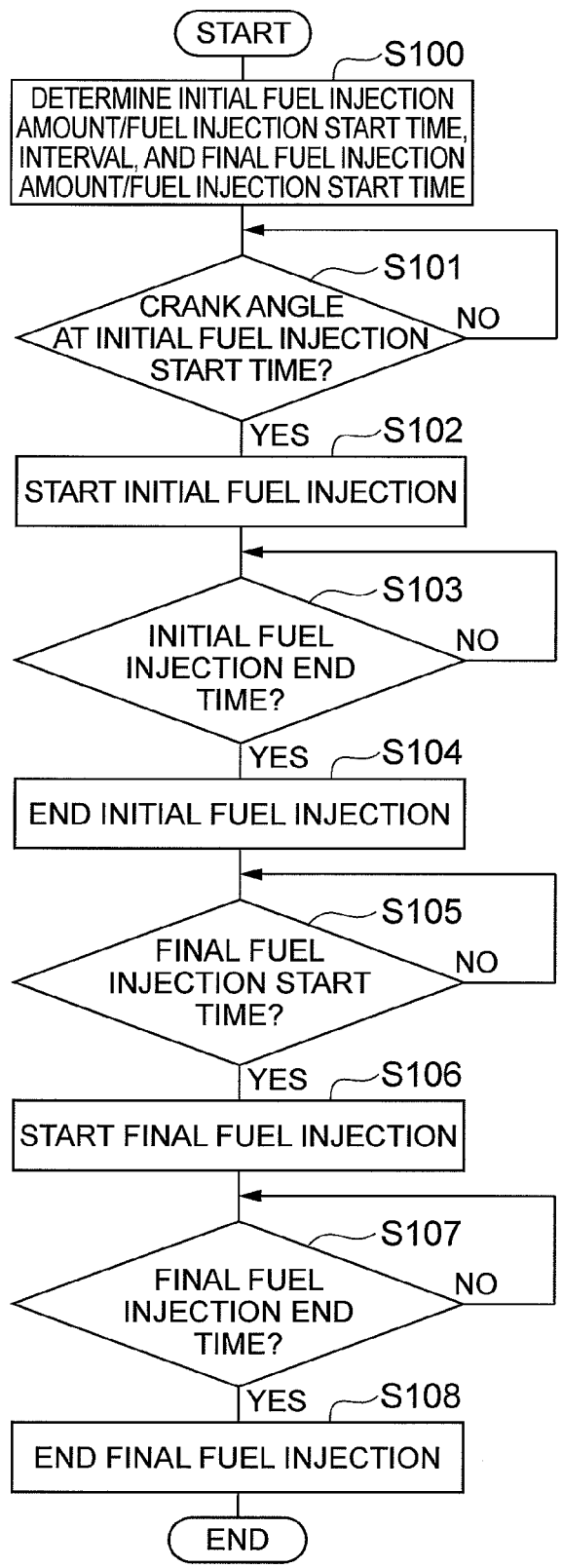
FIG. 4 is a flowchart illustrating details of an injector control processing procedure executed by an injector control unit depicted in FIG. 3.

FIG. 4 is a flowchart illustrating details of an injector control processing procedure executed by the injector control unit 33. This flowchart represents processing in a low load region in which the engine load calculated by the engine load calculation unit 32 is lower than a predetermined value.

First in this chart, according to the engine rotation speed and engine load (accelerator opening), the initial (first) fuel injection amount and fuel injection start time, an interval, and the final (second) fuel injection amount and fuel injection start time are determined from an undepicted in-memory map (step S100). Since the fuel pressure does not change much among before, during, and after a fuel injection in the common rail 9, the fuel injection amount and fuel injection time period have substantially the same meaning.

Subsequently, it is determined whether or not the crank angle detected by the crank angle sensor 30 corresponds to the initial fuel injection start time (step S101).

Figure 5:
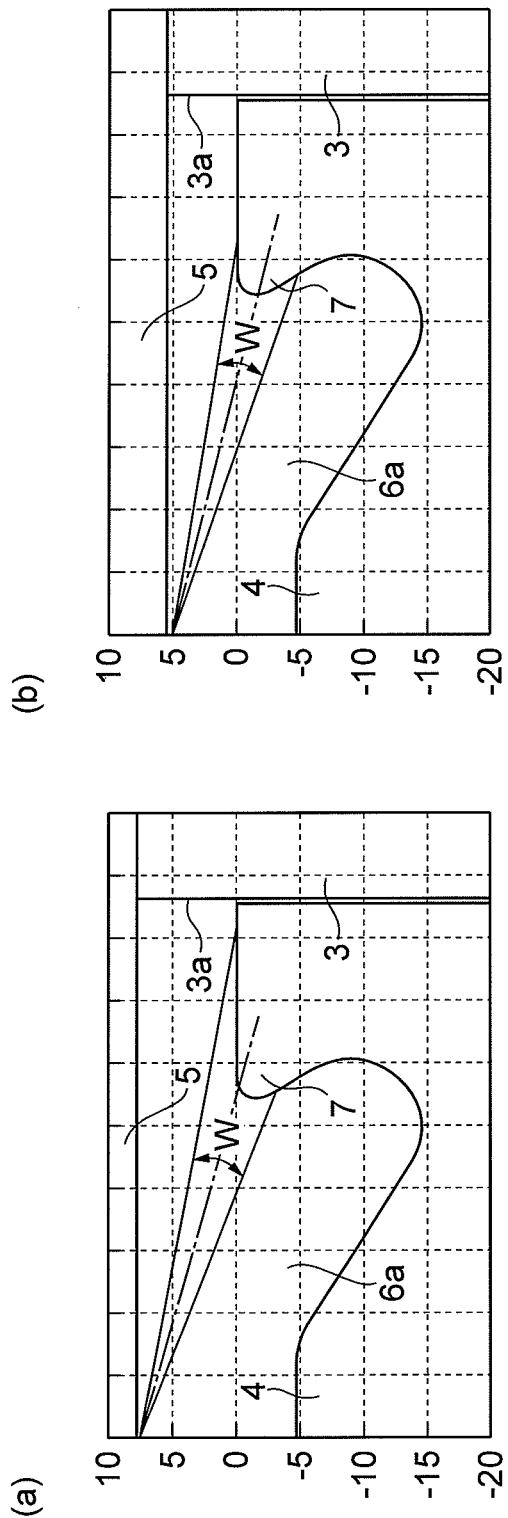
FIG. 5 is a set of diagrams illustrating an initial fuel injection start time at (a) part and a final fuel injection end time at (b) part.

As illustrated in (a) part of FIG. 5, the initial fuel injection start time is a time when the piston 4 arrives at such an elevation point (first elevation point) that the fuel injected from the injector 8 reaches the lip 7 but falls short of reaching the bore wall face 3*a* of the cylinder 3. That is, the initial fuel injection start time is a time when the crank angle is before the compression top dead center (TDC), e.g., −26° ATDC or later. Preferably, in this case, it is determined at step S101 whether or not the crank angle is located at a position slightly in front of the initial fuel injection start time in view of a delay in control in practice. The spread angle W of the fuel injected from the injector 8 is 20°, for example.

Figure 6:
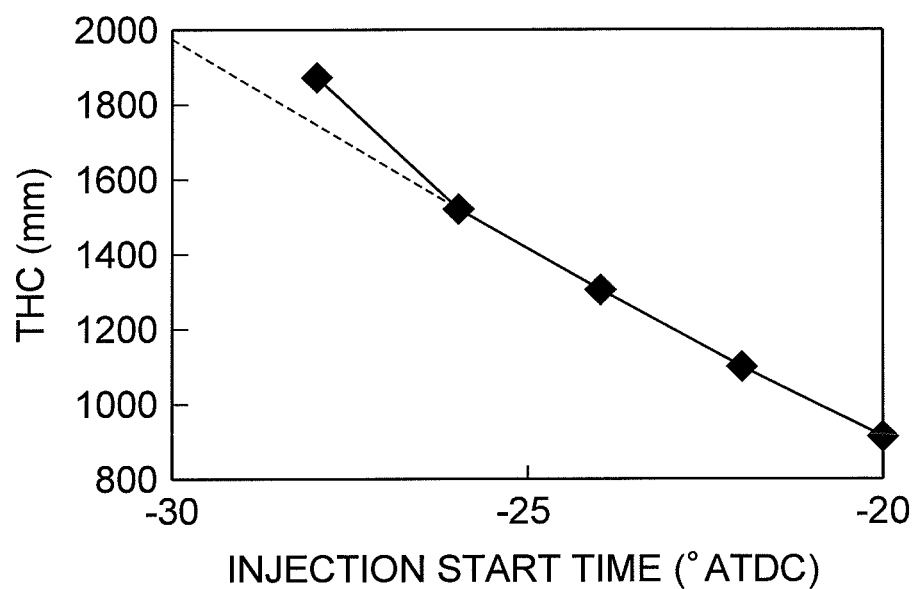
FIG. 6 is a graph illustrating an example of relationships between the crank angle (fuel injection time) and the amount of unburned HC generated.

At a position before the crank angle (fuel injection start time) becomes −26° ATDC, for example, the fuel injected from the injector 8 impinges on the bore wall face 3*a* of the cylinder 3, thereby rapidly increasing HC as illustrated in FIG. 6. Therefore, the first elevation point is set to such a position that the crank angle is −26° ATDC or later, for example.

When it is determined that the crank angle corresponds to the initial fuel injection start time, the injector 8 is controlled so as to start the initial fuel injection (step S102). Here, for fully inhibiting the fuel spray from attaching to the wall face 3*a* of the cylinder 3, the amount of the initial fuel injection is preferably set to 50% or less, more preferably 20% or less, of the total injection amount.

Subsequently, it is determined whether or not the initial fuel injection end time has come (step S103). When it is determined that the initial fuel injection end time has come, the injector 8 is controlled so as to terminate the initial fuel injection (step S104). Then, it is determined whether or not the final fuel injection start time has come (step S105). When it is determined that the final fuel injection start time has come, the injector 8 is controlled so as to start the final fuel injection (step S106).

Thereafter, it is determined whether or not the final fuel injection end time has come (step S107). As illustrated in (b) part of FIG. 5, the final fuel injection end time is a time when the piston 4 arrives at such an elevation point (second elevation point) that the fuel injected from the injector 8 reaches the lip 7 but falls short of reaching a region under the lip 7 in the cavity 6*a*. That is, the initial fuel injection start time is a time when the crank angle is closer to the compression top dead center than is the initial fuel injection start time, e.g., −20° ATDC or earlier. The spread angle W of the fuel injected from the injector 8 is also 20°, for example, at this time.

At a time when the crank angle is later than −20° ATDC, the fuel is more likely to be routed into the cavity 6, so as to exhibit excessive diffusion, thereby generating unburned HC/CO. Therefore, the final fuel injection end time is set to such a time that the crank angle is −20° ATDC or earlier.

When it is determined that the final fuel injection end time has come, the injector 8 is controlled so as to terminate the final fuel injection (step S108).

In the foregoing, the accelerator opening sensor 28, the engine rotation sensor 29, and the engine load calculation unit 32 of the ECU 27 constitute load detection means for detecting the load of the engine. The injector control unit 33 of the ECU 27 constitutes injection valve control means for controlling the fuel injection valve 8 so as to inject the fuel a plurality of times in portions. Here, the steps S101, S102 of the injector control unit 33 constitute first control means for controlling the fuel injection valve 8 so as to start the initial fuel injection when the piston 4 arrives at the first elevation point before the compression top dead center. The steps S107, S108 constitute second control means for controlling the fuel injection valve 8 so as to terminate the final fuel injection by the time when the piston 4 arrives at the second elevation point located closer to the compression dead center than is the first elevation point.

As in the foregoing, this embodiment starts the initial fuel injection when the piston 4 arrives at such a position that the fuel injected from the injector 8 reaches the lip 7 but falls short of reaching the bore wall face 3*a* of the cylinder 3, thereby inhibiting the fuel spray from attaching to the bore wall face 3*a*. This can decrease unburned HC caused by the fuel attaching to the bore wall face 3*a*.

Figure 7:
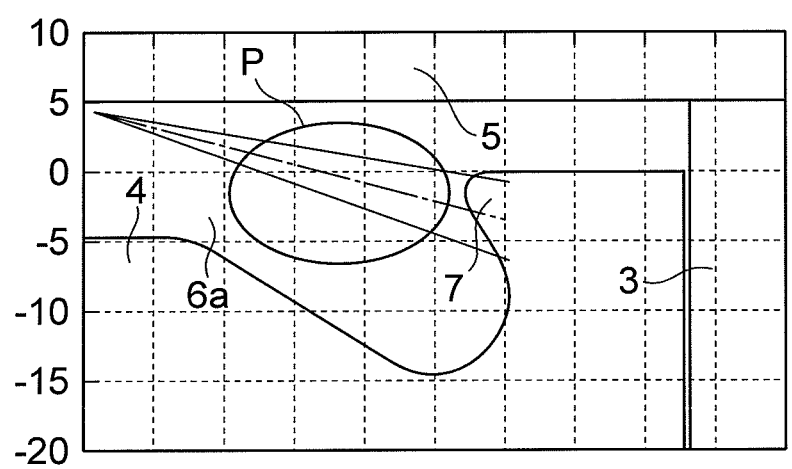
FIG. 7 is a diagram illustrating an appropriate combustion region in a combustion chamber.

It also terminates the final fuel injection by the time when the piston 6 arrives at such a position that the fuel injected from the injector 8 reaches the lip 7 but falls short of reaching a region under the lip 7 in the cavity 6*a*, thereby restraining the fuel from being routed into the cavity 6*a*. This makes the fuel harder to diffuse even when its injection amount is made smaller by low engine load. Therefore, as illustrated in FIG. 7, a mixture with high homogeneity, i.e., neither over-lean nor over-rich, is formed in a relatively narrow space P in the upper part of the cavity 6*a*, so as to be burned. This can decrease unburned HC/CO produced by the excessive diffusion of the fuel. Also, the mixture is inhibited from being made too lean by the excessive diffusion of the fuel, whereby stable combustion can be achieved.

Figure 8:
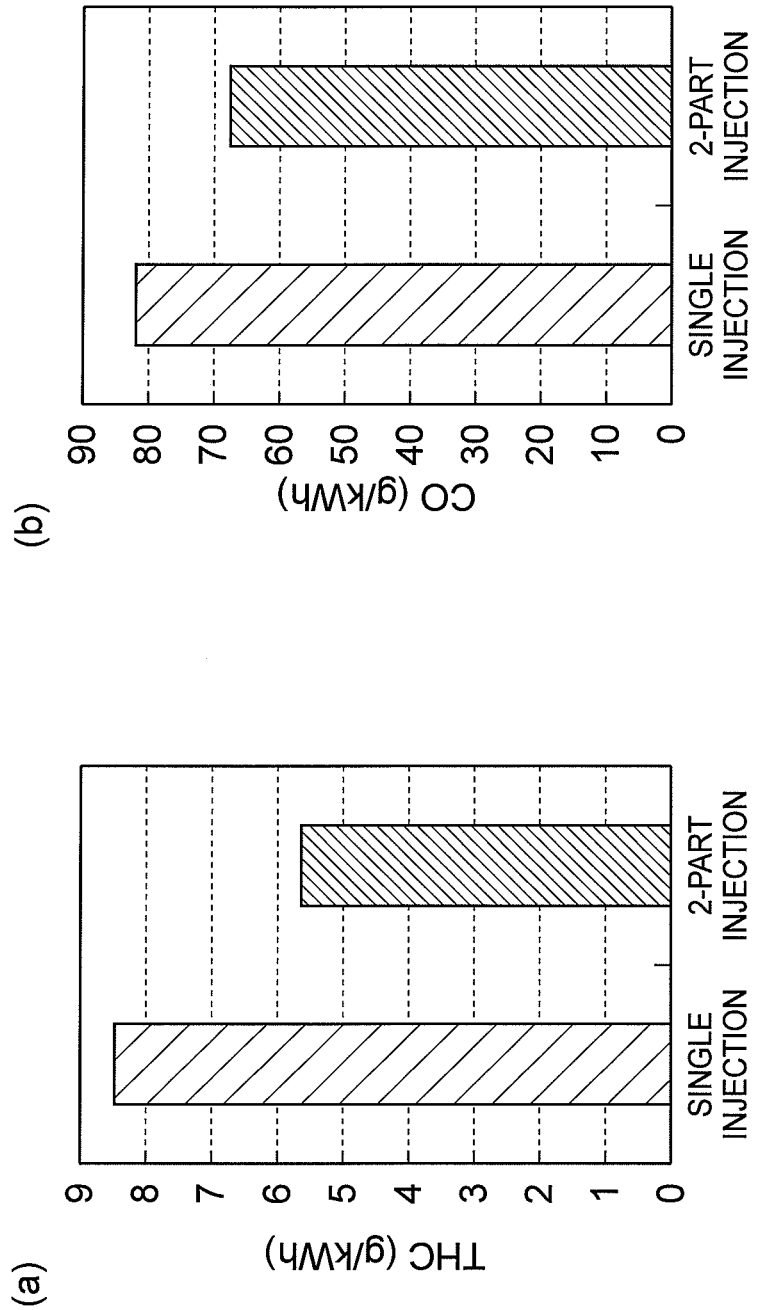
FIG. 8 is a set of graphs illustrating an example of results comparing generated amounts of unburned HC at (a) part and unburned CO at (b) part between a two-part injection and a single injection.

FIG. 8 is a set of graphs illustrating an example of results comparing generated amounts of unburned HC at (a) part and unburned CO at (b) part between a two-part injection and a single injection. It is clear that the amount of unburned HC/CO is smaller when the premixed charge compression ignition combustion is performed in the two-part injection as in this embodiment than in the single injection.

Thus, this embodiment can decrease both of unburned HC caused by the fuel attaching to the bore wall face 3*a* and unburned HC/CO produced by the excessive diffusion of the fuel. As a result, stable premixed charge compression ignition combustion with less unburned fuel and favorable fuel consumption can be achieved.

Figure 9:
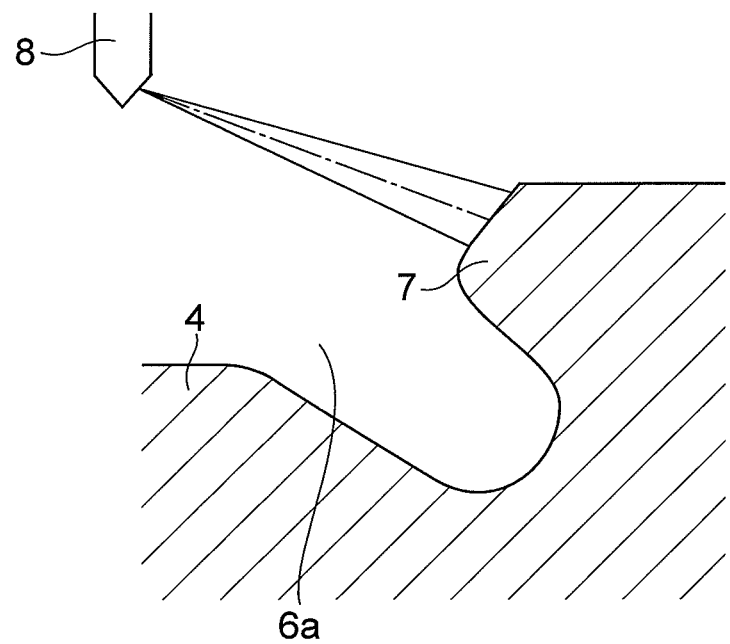
FIG. 9 is a sectional view illustrating a modified example of a lip depicted in FIG. 2.

The present invention is not limited to the above-mentioned embodiment. For example, as illustrated in FIG. 9, the lip 7 may have a substantially flat leading end form in order to make it easier to receive the energy of the fuel spray. If the fuel injected from the injector 8 impinges on the lip 7 in this case, the fuel spray will float in a relatively narrow space in the upper part of the cavity 6*a*, whereby a mixture with high homogeneity can effectively be formed in this space.

From the viewpoint of decreasing unburned HC caused by the fuel attaching to the bore wall face 3*a* and unburned HC/CO produced by the excessive diffusion of the fuel, it will be more preferred if the common pressure of the common rail 9 is lower. However, this makes it necessary to take a balance with deterioration in smoke.

Though the above-mentioned embodiment starts the initial fuel injection when the piston 4 arrives at the first elevation point where the fuel injected from the injector 8 reaches the lip 7 but falls short of reaching the bore wall face 3a of the cylinder 3 and terminates the final fuel injection when the piston 4 arrives at the second elevation point where the fuel injected from the injector 8 reaches the lip 7 but falls short of reaching a region under the lip 7 in the cavity 6a in the case where the engine load is lower than a predetermined value, the initial and final fuel injections may be performed at the times mentioned above regardless of the engine load in particular.

Though the above-mentioned embodiment is controlled so as to terminate the final fuel injection when the piston 4 arrives at the second elevation point, the time for terminating the final fuel injection is not limited to the second elevation point in particular. If an interval for yielding an effect of a divided injection can be set, the final fuel injection may be terminated before the piston 4 reaches the second elevation point.

Though the above-mentioned embodiment performs the premixed charge compression ignition combustion in the two-part injection, the number of divisions of fuel injection concerning the premixed charge compression ignition combustion may be 3 or more. In this case, it will be sufficient if the initial (first) fuel injection is started when the piston 4 arrives at the first elevation point, and the final fuel injection is terminated by the time when the piston 4 arrives at the second elevation point.

What is claimed is:

1. A combustion control device for an engine having a piston disposed so as to be able to move up and down in a reciprocating manner within a cylinder and performing premixed charge compression ignition combustion, the device comprising:
    a fuel injection valve for injecting a fuel into a combustion chamber formed by the cylinder and piston; and
    injection valve control means for controlling the fuel injection valve so as to inject the fuel a plurality of times in portions;
    wherein an upper part of the piston is provided with a recessed cavity forming a part of the combustion chamber;
    wherein an upper end part of an inner wall face of the piston forming the cavity is provided with a lip projecting inwardly of the piston;
    wherein the injection valve control means has first control means for controlling the fuel injection valve so as to start an initial fuel injection when the piston arrives at a first elevation point before a compression top dead center and second control means for controlling the fuel injection valve so as to terminate a final fuel injection by the time when the piston arrives at a second elevation point located closer to the compression dead center than is the first elevation point;
    wherein the first elevation point is such a position that the fuel injected from the fuel injection valve reaches the lip but falls short of reaching a bore wall of the cylinder; and
    wherein the second elevation point is such a position that the fuel injected from the fuel injection valve reaches the lip but falls short of reaching a region under the lip in the cavity.

2. A combustion control device according to claim 1, further comprising load detection means for detecting a load of the engine;
    wherein the first and second control means are executed when the load of the engine detected by the load detection means is lower than a predetermined value.

3. A combustion control device according to claim 1, wherein the second control means controls the fuel injection valve so as to terminate the final fuel injection when the piston arrives at the second elevation point.

4. A combustion control device according to claim 1, wherein the lip has a substantially flat leading end form.

* * * * *